(12) United States Patent
Schultz et al.

(10) Patent No.: US 11,999,365 B2
(45) Date of Patent: Jun. 4, 2024

(54) METHOD FOR CARRYING OUT A START-UP PROCESS FOR AN AT LEAST SEMI-AUTOMATED VEHICLE

(71) Applicant: Robert Bosch GmbH, Stuttgart (DE)

(72) Inventors: Andreas Schultz, Freiberg Am Neckar (DE); Lukas Oppolzer, Stuttgart (DE); Selina Meier, Ludwigsburg (DE); Tobias Hofmann, Unterheinriet (DE); Nils Pletschen, Besigheim (DE); Thomas Brettschneider, Leonberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 223 days.

(21) Appl. No.: 17/835,580

(22) Filed: Jun. 8, 2022

(65) Prior Publication Data
US 2022/0396277 A1    Dec. 15, 2022

(30) Foreign Application Priority Data

Jun. 14, 2021   (DE) .................... 10 2021 206 007.2

(51) Int. Cl.
*B60W 50/035*   (2012.01)
*B60W 50/02*    (2012.01)

(52) U.S. Cl.
CPC ...... *B60W 50/035* (2013.01); *B60W 50/0205* (2013.01); *B60W 2520/10* (2013.01); *B60W 2720/10* (2013.01)

(58) Field of Classification Search
CPC ........... B60W 50/035; B60W 50/0205; B60W 2520/10; B60W 2720/10; B60W 2554/60; B60W 2720/24; B60W 2754/30; B60W 60/001; B60W 30/18027; B60W 30/18009; B60W 50/00; B60W 2050/0075
See application file for complete search history.

(56) References Cited

U.S. PATENT DOCUMENTS

| 10,101,743 B2 * | 10/2018 | Abe ................. B60W 60/0059 |
| 10,967,855 B2 * | 4/2021 | Ji ........................ B60W 30/143 |
| 2023/0391197 A1 * | 12/2023 | Shinozaki ............. B60L 3/0061 |
| 2024/0051558 A1 * | 2/2024 | Shivaprasad ....... B60W 50/082 |

FOREIGN PATENT DOCUMENTS

| CN | 107303908 B * | 10/2020 | ............. B60K 28/06 |
| EP | 3778333 A1 * | 2/2021 | ............. B60K 35/00 |

OTHER PUBLICATIONS

Trent Victor, Oct. 31, 2017, English Machine Translation_ CN107303908A provided by Patent Translate by EPO and Google ( Year: 2017).*

* cited by examiner

*Primary Examiner* — Peter D Nolan
*Assistant Examiner* — Ashley L Redhead, Jr.
(74) *Attorney, Agent, or Firm* — NORTON ROSE FULBRIGHT US LLP; Gerard A. Messina

(57) ABSTRACT

A method for carrying out a start-up process of an at least semi-automated vehicle. The method includes: recognizing at least one unsuccessful start-up process using a first set of drive parameters; reporting the unsuccessful start-up process to a control system; receiving changed driving-related boundary conditions from the control system; ascertaining at least one changed drive parameter from the changed driving-related boundary conditions; and repeating the start-up process at least once, using the at least one changed drive parameter.

12 Claims, 2 Drawing Sheets

METHOD FOR CARRYING OUT A START-UP PROCESS FOR AN AT LEAST SEMI-AUTOMATED VEHICLE

CROSS REFERENCE

The present application claims the benefit under 35 U.S.C. § 119 of German Patent Application No. 10 2021 206 007.2 filed on Jun. 14, 2021, which is expressly incorporated herein by reference in its entirety.

FIELD

The present invention relates to a method for carrying out a start-up process for an at least semi-automated vehicle. The present invention furthermore relates to a device for carrying out a start-up process of an at least semi-automated vehicle. The present invention furthermore relates to a computer program product.

BACKGROUND INFORMATION

In a conventional method for carrying out a start-up process for an automated vehicle, an obstacle (e.g., a curb of a parking facility boundary) is to be and may be traversed. In the process, the driving force required for starting is increased until a previously calculated limiting value is reached. In the event that the start-up process or the traversing of the obstacle was not successful, the attempt is aborted, and a higher-level control system is informed accordingly so that it may abort the maneuver. The limiting value may be determined from a permissible maximum speed and/or an available space, i.e., the distance until the desired stopping point.

SUMMARY

It is an object of the present invention to provide an improved method for carrying out a start-up process for an at least semi-automated vehicle.

According to a first aspect of the present invention, the object may be achieved by a method for carrying out a start-up process for an at least semi-automated vehicle. In accordance with an example embodiment of the present invention, the method includes the following steps:
  recognizing at least one unsuccessful start-up process using a first set of drive parameters;
  reporting the unsuccessful start-up process to a control system;
  receiving changed driving-related boundary conditions from the control system;
  ascertaining at least one changed drive parameter from the changed driving-related boundary conditions; and
  repeating the start-up process at least once, using the at least one changed drive parameter.

In this way, a method for operating the vehicle in the longitudinal direction is provided, which may advantageously be used, e.g., for parking processes. In the process, an obstacle to be overcome may be present in the form of a curb. However, processes on uphill grades are also possible, during which a certain vehicle mass must be set in motion. In addition to the provided method for longitudinal control, a higher-level control system is also responsible for controlling the vehicle in the transverse direction.

According to a second aspect of the present invention, the object may be achieved by a device which is configured to carry out a provided method of the present invention. This may, e.g., be an electronic control unit of the vehicle.

According to a third aspect of the present invention, the object may be achieved by a computer program product including program code means for carrying out the provided method when it runs on a provided electronic device or is stored on a computer-readable data medium.

Advantageous refinements of the provided method of the present invention are disclosed herein.

One advantageous refinement of the method of the present invention provides that the driving-related boundary conditions are as follows: available residual distance of the at least semi-automated vehicle in the longitudinal direction, permissible maximum speed of the at least semi-automated vehicle in the longitudinal direction, and driving direction of the at least semi-automated vehicle. In this way, a set of changed driving-related boundary conditions is received from the higher-level control system, from which computationally changed drive parameters are then ascertained.

One further advantageous refinement of the method of the present invention provides that the at least one repetition of the start-up process is carried out with a changed driving direction.

Another advantageous refinement of the method of the present invention provides that a changed permissible drive power is calculated with a changed residual distance and/or a changed permissible maximum speed, a new start-up process being carried out in the event that the changed drive power is greater than in the unsuccessful start-up process. In this way, a new start-up process is dispensed with when the newly ascertained permissible maximum value of one of the drive parameters is smaller than in the preceding unsuccessful start-up process. In this way, an efficiency of the provided method is advantageously increased.

Another advantageous refinement of the method of the present invention provides that the drive power is incrementally increased in a defined manner until a maximum value is reached. Advantageously, a start-up process may thus be attempted multiple times, a final abortion only being carried out after a defined number of unsuccessful start-up processes.

Another advantageous refinement of the method of the present invention provides that a new start-up process is started when the predefined driving direction has changed, and the driving direction previously was a reason for the unsuccessful start-up process.

Another advantageous refinement of the method of the present invention provides that a new start-up process is started when the changed residual distance takes on a larger value, and the residual distance was a reason for the unsuccessful start-up process.

Another advantageous refinement of the method of the present invention provides that a new start-up process is started when the predefined maximum speed takes on a larger value, and the maximum speed previously was a reason for the unsuccessful start-up process. Advantageously, a new start-up process may thus even be carried out when one of the described driving-related boundary conditions, for example only the residual distance or only the maximum speed, has changed.

Another advantageous refinement of the provided method of the present invention provides that, in the case of an unsuccessful start-up process, it is reported to the higher-level control system due to which driving-related boundary condition the start-up process was unsuccessful. In this way, for example, a control of the vehicle may be transferred to a driver. Advantageously, additionally a purposeful operating principle of the higher-level control system is supported in this way.

Another advantageous refinement of the method in accordance with the present invention provides that a safeguarding of the semi-automated vehicle is initiated by the higher-level control system. Advantageously, the vehicle may be transferred into a safe state in this way, for example, a parking brake may be activated.

The present invention is described in greater detail hereafter with further features and advantages based on two figures. All described or illustrated features, either alone or in any arbitrary combination, form the subject matter of the present invention, regardless of the wording or representation thereof in the description or in the figures.

Described features and advantages of the provided method of the present invention result similarly from described features and advantages of the provided device of the present invention and of the provided computer program product of the present invention, and vice versa.

DETAILED DESCRIPTION OF EXAMPLE EMBODIMENTS

Figure 1:
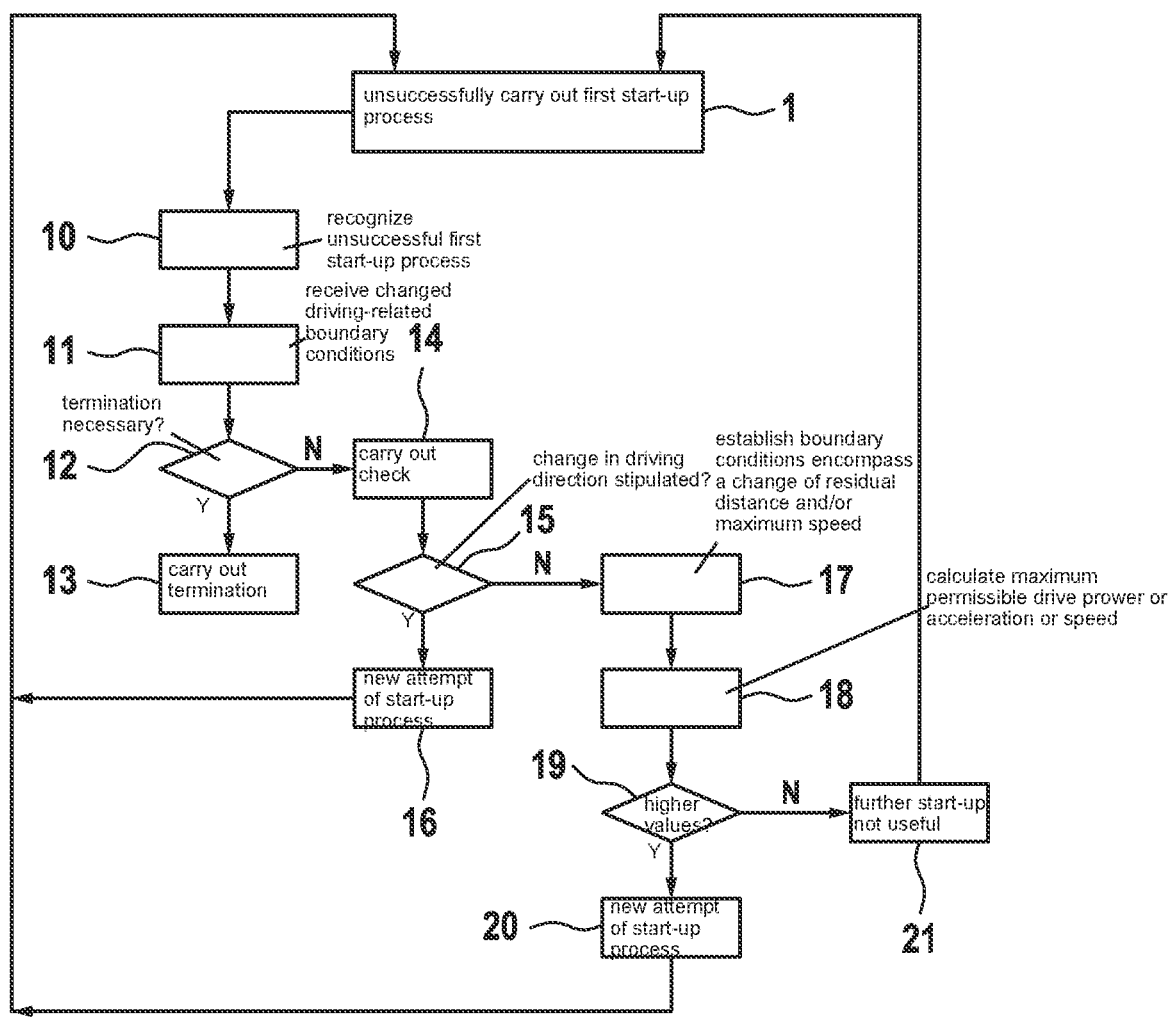
FIG. 1 shows a schematic operating principle of one example embodiment of a method of the present invention.

Hereafter, the term "automated vehicle" is used synonymously with the terms "fully automated vehicle," "autonomous vehicle," "semi-autonomous vehicle," and "automated e-vehicle."

With the aid of the provided method, it is advantageously possible to increase a robustness in an aforementioned situation in that, after an unsuccessful attempt of a start-up process, changes in driving-related boundary or framework conditions are monitored and utilized. When a change in the aforementioned boundary conditions is recognized, it is checked whether this change implies a higher probability of a successful start-up process. If this is the case, a renewed start-up process is initiated and carried out so that, in this way, a probability of a successful start-up process may be increased.

In a conventional method, in the case of an unsuccessful start-up process or an attempt to traverse an obstacle, a higher-level electronic control system (e.g., overall control device for longitudinal and lateral guidance of the vehicle) is informed so that it may abort an automated driving function regarding the start-up process. Beyond purely traversing an "obstacle" (e.g., curb), the method may be used in the following situations:

starting on an uphill grade;
starting with a load or a trailer;
starting against a trailer including an overrun brake.

The provided improvement of the conventional method may thus advantageously affect an overall functionality, in particular, in these situations. The described improvement may, in particular, be that an abortion of the start-up process does not necessarily have to take place in the described situations, but that a renewed attempt is to be undertaken when the framework conditions change, provided this attempt is promising. In the process, the changed driving-related boundary conditions are, in particular, the following parameters:

a greater available route ("residual distance");
a higher permissible speed;
a higher permissible acceleration;
a changed driving direction request; and
potentially further possible changes.

With the aid of the provided method, a larger portion of successfully carried out automated start-up processes may advantageously be provided by a decreased number of aborted, unsuccessful start-up processes.

A start-up process, or the desired traversing of an obstacle, is rarely limited "in absolute terms"; the limitation of the maximum permissible or desired force requirement usually arises from the framework conditions of the instantaneous start-up maneuver, in particular, the available space within the meaning of a distance along the vehicle movement axis ("residual distance"), which is predefined by the higher-level control system in the form of the residual distance, as well as the maximum permissible maximum speed, which arises, for example, from a curvature of a setpoint path, and also by the higher-level control system.

According to the conventional method, both pieces of information are used for calculating a maximum threshold value which the power requested from the powertrain of the vehicle should not exceed to prevent one or both of these relevant limit(s) from being exceeded. The shorter the residual distance, and the lower the maximum speed, the lower is this maximum threshold value, the more critical of the two values being used for the limitation (minimum).

In an intermediate step, the limitation may, in particular, calculate a maximum permissible longitudinal acceleration in the movement direction of the vehicle from which, in turn, the maximum permissible acceleration power is ascertained. If the start-up process or the traversing of an obstacle was not successful using the accordingly limited power request, the automated driving function aborts the start-up process using the conventional method.

As a result, the drive power request is reduced to a lower value (e.g., idle) and, at the same time, sufficient braking power is built up to reliably maintain the vehicle at a standstill. This is also reported to the higher-level control system, so that it may prompt the abortion of the start-up process.

In accordance with the present invention, it is provided in this case that no abortion of the automated driving function or of the start-up process is predefined. Instead, a renewed start-up process should be carried out in response to changes in the described driving-related boundary conditions, which are available for the provided method as input variables. This means, in particular, that a further start-up process may be attempted, provided that:

1. the predefined residual distance takes on a larger value, and the residual distance was previously the limiting factor for the permissible maximum power; and/or
2. the predefined maximum speed takes on a larger value, and the maximum speed was previously the limiting factor for the permissible maximum power; and/or
3. the predefined maximum acceleration takes on a larger value, and the maximum acceleration was previously the limiting factor for the permissible maximum power; and/or
4. a driving maneuver including a different direction request (forward/backward) is requested.

It is also possible for multiple of the described conditions 1. through 4. to apply at the same time.

Depending on the specific embodiment, these four conditions may also be only in part (at least one) used for the decision-making for a renewed start-up process. In the considered application, a change of these conditions may, in particular, take place after the higher-level control system has newly planned the maneuver. To enable such a reaction, the feedback to the higher-level control system about an unsuccessful start-up/traversing process may be significant. The new planning of a travel path may, for example, be carried out using changed characteristic values to still be able to carry out the automated driving function successfully. The higher-level control system is usefully informed about the fact that a further attempt of a start-up process is made due to the changed driving-related boundary conditions or requirements.

It is provided that a new start-up process is started whenever the predefined driving direction changes, e.g., even when the driving direction was a reason for an unsuccessful start-up process. In principle, both described options are possible, "residual distance" and "maximum speed" being combined in the implementation for calculating the limiting value, i.e., a higher residual distance or a higher maximum speed not necessarily resulting in a new start-up attempt. In contrast, a new attempt is always triggered when the requested driving direction changes since it is assumed that this attempt is most likely successful.

This may, for example, take place by retracting a previously communicated piece of information about a failed start-up/traversing process. In one specific embodiment, all aforementioned conditions (and possibly further suitable conditions) may be used to carry out a further attempt.

In another specific embodiment, it is possible to use only some of conditions 1. through 4. For example, a further attempt of a start-up process may only be carried out when the residual distance changes, but not when the maximum speed changes. This may enable a finer matching of the behavior of the provided method to possible customer requests.

In another specific embodiment of the provided method, the described conditions may be used indirectly, for example in that initially a maximum permissible acceleration is calculated by the provided method from the residual distance and the maximum speed, and is then used for the definition of the limiting value. This allows a physically more useful or more easily comprehensible implementation and application of the provided method, and may thus advantageously contribute to reduced development and application complexity.

In another specific embodiment of the provided method, the method may be functionally distributed among multiple software sub-components. For example, one component may be responsible for the calculation, in terms of software, of the maximum permissible acceleration, and another sub-component may be responsible for adjusting this acceleration. In this way, in particular, a number of interfaces between the software sub-components may be reduced. Moreover, this specific embodiment enables a greater flexibility with respect to a system architecture and thus may possibly be integrated more easily into existing architectures or functions.

In another specific embodiment, the provided method may also be employed in similar situations in which the at least semi-automated vehicle was not able to successfully carry out a start-up process. In this way, for example, a start-up process is even aborted when an undesirable rolling back of the at least semi-automated vehicle occurs (e.g., on an uphill grade) during the start-up process.

Instead of a complete abortion of the automated driving function, a further start-up process may also be attempted in this case, for example when a changed driving direction is predefined by the higher-level control system. In the process, the conditions which trigger a further start-up process may be selected to be different, depending on the situation, i.e., depending on the reason for the lack of success of the start-up process.

In a further specific embodiment, the higher-level control system may additionally be informed about which of the present driving-related boundary conditions (e.g., residual distance) was primarily responsible for the failed start-up process. This may, for example, also take place in that the estimated minimum requirements (e.g., the minimum required residual distance) for a successful start-up process are reported back to the higher-level control system. In this way, the higher-level control system may select its new request in such a way that a prospect of success during a further attempt of a start-up process for the at least semi-automated vehicle is maximized.

The provided method may, in particular, be useful during parking processes during which geometrically defined obstacles (e.g., parking boundaries in the form of reduced-height curbs, grooves in the pavement, etc.) are to be and may be overcome. The use of the provided method is also possible during start-up processes on a hill or on uphill grades.

Based on FIG. 1, a schematic operating principle of one specific embodiment of the provided method is now explained in greater detail.

FIG. 1 shows the aforementioned method 1, which carries out a start-up process simply using defined parameters (e.g., drive power, maximum speed) and aborts it if unsuccessful.

An improved method is provided, which is able to carry out the start-up process using changed parameters, even multiple times, and finally aborts it only if unsuccessful multiple times, for example by transferring the vehicle into a safe state (e.g., parking position).

In a step 1, a first start-up process of an at least semi-automated vehicle is unsuccessfully carried out.

This is recognized in a step 10 and relayed to a higher-level control system (not shown) of the vehicle. The higher-level control system thereupon carries out a new planning of a route of the start-up process and relays changed driving-related boundary conditions to the provided method.

In a step 11, these changed driving-related boundary conditions are received.

In a step 12, a check is carried out as to whether it is necessary to terminate the start-up process based on the changed driving-related boundary conditions.

If this applies, in a step 13 a defined termination of the provided method for carrying out a start-up process is carried out, and a defined vehicle safeguarding (e.g., an emergency brake of the vehicle) is activated.

However, if it is established in step 12 that a termination of the start-up process is not intended based on the changed driving-related boundary conditions, a check of the changed driving-related boundary conditions is carried out in a step 14. In the process, the following parameters are received from the higher-level control system: available residual distance of the at least semi-automated vehicle in the longitudinal direction, permissible maximum speed of the at least semi-automated vehicle in the longitudinal direction, and driving direction of the at least semi-automated vehicle.

In a step 15, it is checked whether the changed driving-related boundary conditions stipulate a change in the driving direction (e.g., from forward direction to backward direction, or vice versa).

If this applies, in a step 16 a new attempt of the start-up process using the drive parameters and the changed driving direction is carried out. For example, the start-up process is started with a backward movement of the vehicle.

If it is established in step 15 that the changed driving-related boundary conditions do not stipulate a change in the driving direction, it is established in a step 17 that the changed driving-related boundary conditions encompass a change of the residual distance and/or of the permissible maximum speed.

In a step 18, a calculation of the maximum permissible drive power or of the maximum permissible acceleration from the residual distance or the permissible maximum speed takes place.

In a step 19, it is checked whether the values of the acceleration or of the drive power ascertained in step 18 are higher than those during the unsuccessful start-up process of step 1.

If this applies, a new attempt of the start-up process is carried out in a step 20.

If it is established in step 19 that the values of the acceleration or of the drive power ascertained in step 18 are lower than those during the unsuccessful start-up process of step 1, it is decided in a step 21 that a further start-up process is not useful, and this is reported back.

Figure 2:
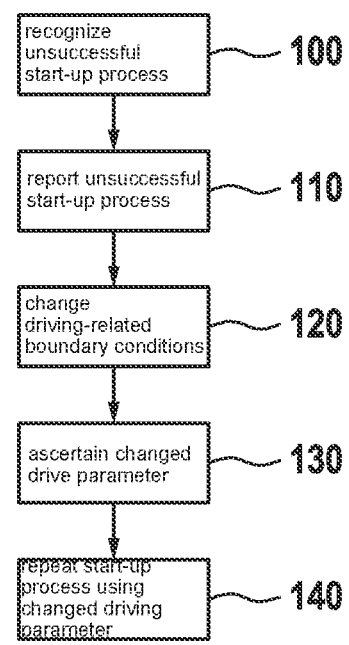
FIG. 2 shows a schematic sequence of one specific example embodiment of a method of the present invention.

FIG. 2 shows a sequence of one specific embodiment of the provided method. In a step 100, a recognition of at least one unsuccessful start-up process using a first set of drive parameters takes place.

In a step 110, the unsuccessful start-up process is reported to a higher-level control system.

In a step 120, changed driving-related boundary conditions are received from the higher-level control system.

In a step 130, at least one changed drive parameter is ascertained from the changed driving-related boundary conditions.

In a step 140, the start-up process is repeated at least once, using the at least one changed drive parameter.

Advantageously, the provided method may be carried out in an electronic control unit of the at least semi-automated vehicle.

Advantageously, the provided method may be implemented in the form of software for the longitudinal control of the vehicle (vehicle motion control regarding longitudinal control), in a decentralized manner on an electronic control unit in the vehicle or centrally in the cloud. This supports an easy adaptability of the method. For example, it is also supported in this way that the provided method may also be carried out on control units of third-party providers.

For example, the provided method, in the form of software, may be divided among multiple software sub-components, which are each self-contained and include defined interfaces to other software sub-components. As an alternative, the provided method may also be implemented as a single software component.

Those skilled in the art will suitably modify the features of the present invention and/or combine them with one another, without departing from the core of the present invention, in view of the disclosure herein.

What is claimed is:

1. A method for carrying out a start-up process of an at least semi-automated vehicle, comprising the following steps:
    recognizing at least one unsuccessful start-up process using a first set of drive parameters;
    reporting the unsuccessful start-up process to a control system;
    receiving changed driving-related boundary conditions from the control system;
    ascertaining at least one changed drive parameter from the changed driving-related boundary conditions; and
    repeating the start-up process at least once, using the at least one changed drive parameter.

2. The method as recited in claim 1, wherein the driving-related boundary conditions are as follows: available residual distance of the at least semi-automated vehicle in the longitudinal direction, permissible maximum speed of the at least semi-automated vehicle in the longitudinal direction, and driving direction of the at least semi-automated vehicle.

3. The method as recited in claim 2, wherein the at least one-time repetition of the start-up process is carried out with a changed driving direction.

4. The method as recited in claim 2, wherein a changed permissible drive power is calculated with a changed residual distance and/or a changed permissible maximum speed, and a new start-up process is carried out when the changed drive power is greater than in the unsuccessful start-up process.

5. The method as recited in claim 4, wherein the drive power is incrementally increased in a defined manner until a maximum value is reached.

6. The method as recited in claim 1, wherein a new start-up process is started when a predefined driving direction has changed, and the predefined driving direction previously was a reason for the unsuccessful start-up process.

7. The method as recited in claim 1, wherein a new start-up process is started when a changed residual distance takes on a larger value, and the residual distance was a reason for the unsuccessful start-up process.

8. The method as recited in claim 1, wherein a new start-up process is started when the predefined maximum speed takes on a larger value, and the maximum speed was a reason for the unsuccessful start-up process.

9. The method as recited in claim 1, wherein, in the case of the unsuccessful start-up process, it is reported to the higher-level control system due to which driving-related boundary condition the start-up process was unsuccessful.

10. The method as recited in claim 9, wherein a safeguarding of the semi-automated vehicle is initiated by the higher-level control system.

11. A device configured to carry out a start-up process of an at least semi-automated vehicle, the device configured to:
    recognize at least one unsuccessful start-up process using a first set of drive parameters;
    report the unsuccessful start-up process to a control system;
    receive changed driving-related boundary conditions from the control system;
    ascertain at least one changed drive parameter from the changed driving-related boundary conditions; and
    repeat the start-up process at least once, using the at least one changed drive parameter.

12. A non-transitory computer-readable data medium on which is stored a computer program including program code for carrying out a start-up process of an at least semi-automated vehicle, the program code, when executed by a computer, causing the computer to perform the following steps:
    recognizing at least one unsuccessful start-up process using a first set of drive parameters;
    reporting the unsuccessful start-up process to a control system;
    receiving changed driving-related boundary conditions from the control system;

ascertaining at least one changed drive parameter from the changed driving-related boundary conditions; and repeating the start-up process at least once, using the at least one changed drive parameter.

\* \* \* \* \*